US008538789B1

(12) United States Patent
Blank et al.

(10) Patent No.: US 8,538,789 B1
(45) Date of Patent: Sep. 17, 2013

(54) MILEAGE TRACKING SYSTEM AND METHOD

(75) Inventors: Bennett R. Blank, San Diego, CA (US); Jonathan S. Sparks, Carlsbad, CA (US); Gang Wang, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 557 days.

(21) Appl. No.: 12/610,155

(22) Filed: Oct. 30, 2009

(51) Int. Cl.
*G06Q 10/00* (2012.01)

(52) U.S. Cl.
USPC ........................................................ 705/7.11

(58) Field of Classification Search
USPC .......................... 701/23, 24, 25, 35, 207, 213
See application file for complete search history.

(56) References Cited

U.S. PATENT DOCUMENTS

| | | | | |
|---|---|---|---|---|
| 4,593,263 A * | 6/1986 | Peckworth | ............... | 340/457.4 |
| 4,875,167 A * | 10/1989 | Price et al. | ................... | 701/32.5 |
| 5,046,007 A * | 9/1991 | McCrery et al. | ............. | 701/29.6 |
| 5,267,159 A * | 11/1993 | O'Neall | ........................ | 701/35 |
| 5,337,236 A * | 8/1994 | Fogg et al. | ................... | 701/32.5 |
| 5,862,500 A * | 1/1999 | Goodwin | ...................... | 701/32.5 |
| 5,974,356 A * | 10/1999 | Doyle et al. | .................. | 701/420 |
| 6,301,533 B1 * | 10/2001 | Markow | ........................ | 701/32.4 |
| 6,718,263 B1 * | 4/2004 | Glass et al. | .................... | 701/522 |
| 6,741,933 B1 * | 5/2004 | Glass | ............................. | 701/454 |
| 6,778,900 B2 * | 8/2004 | Tengler et al. | ................. | 701/527 |
| 7,206,720 B2 * | 4/2007 | LaPant | .......................... | 702/182 |
| 7,395,230 B2 * | 7/2008 | Hermreck et al. | .............. | 705/31 |
| 7,558,777 B1 * | 7/2009 | Santos | ................... | 1/1 |
| 7,908,191 B1 * | 3/2011 | Dinamani et al. | .............. | 705/31 |
| 7,966,112 B1 * | 6/2011 | Morris, Jr. | ................... | 701/29.4 |
| 2001/0020204 A1 * | 9/2001 | Runyon et al. | ................... | 701/35 |
| 2003/0187572 A1 * | 10/2003 | Tengler et al. | ................ | 701/201 |
| 2004/0243489 A1 * | 12/2004 | Mitchell et al. | ................. | 705/30 |
| 2007/0150139 A1 * | 6/2007 | Hardy | ............................. | 701/35 |
| 2007/0173993 A1 * | 7/2007 | Nielsen et al. | .................. | 701/35 |
| 2007/0250258 A1 * | 10/2007 | Hager | ........................... | 701/201 |
| 2007/0282638 A1 * | 12/2007 | Surovy | ............................ | 705/4 |
| 2008/0030376 A1 * | 2/2008 | Tunnell et al. | ................ | 340/988 |
| 2008/0091630 A1 * | 4/2008 | Bonissone et al. | ............. | 706/45 |
| 2009/0045984 A1 * | 2/2009 | Tunnell et al. | ................ | 340/988 |
| 2011/0112717 A1 * | 5/2011 | Resner | ........................... | 701/33 |

OTHER PUBLICATIONS

Robert K. Kumapley and Jon D. Fricker, "Review of Methods for Estimating Vehicle Miles Traveled", Jan. 15, 2007, Transportation Research Board of the National Academies; vol. 1551 / 1996.*
Timothy R. Reuscher, "Transferability of Nationwide Personal Transportation Survey Data to Regional and Local Scales", 2002, Transportation Research Board of the National Academies.*

* cited by examiner

*Primary Examiner* — Brett Feeney
(74) *Attorney, Agent, or Firm* — Vista IP Law Group LLP

(57) ABSTRACT

A mileage tracking system tracks trip data for a user over time, based on trip data provided by the user. The system provides the user with results of the tracking for a specified time period (e.g., a tax year), and the results may be estimated based on the trip data provided by the user as well as trip data provided by other users. The trip data is typically provided by mobile communication devices transmitting the data to a system server, in response to commands entered into the mobile communication devices.

33 Claims, 3 Drawing Sheets

MILEAGE TRACKING SYSTEM AND METHOD

BACKGROUND

The invention relates to tracking and estimating vehicle odometer values for reporting purposes such as tax deductions or mileage reimbursement. Users often forget to record odometer readings in a timely manner, and are thus required to later recall or estimate the readings, resulting in inaccurate reporting.

SUMMARY

In one aspect of the invention, mileage is tracked by: receiving (e.g., from a mobile communication device), first trip data corresponding to a first trip of a first user during a first time period, the first trip data comprising a starting odometer reading and an ending odometer reading corresponding to a start and an end of the first trip respectively, a starting date and an ending date corresponding to the start and the end of the first trip respectively, and a category (e.g., business purpose; personal purpose; medical or moving purpose; and service to a charitable organization) associated with the first trip; updating aggregate trip data in a database based at least in part on at least a portion of the first trip data and on a first profile associated with the first user; receiving (e.g., from a mobile communication device) second trip data corresponding to a second trip of a second user during a second time period, the second trip data comprising a starting odometer reading and an ending odometer reading corresponding to a start and an end of the second trip respectively, a starting date and an ending date corresponding to the start and end of the second trip respectively, and a category associated with the second trip; updating the aggregate trip data based at least in part on at least a portion of the second trip data and on a second profile associated with the second user; determining an estimated mileage for the second user for a period of time other than the second time period, based at least in part on the aggregate trip data; and sending data representing the estimated mileage to the second user over a communications network, typically in a format suitable for importation into an electronic tax return. The first and second trip data qualify to be aggregated into the aggregate trip data based at least in part on a value of a first data field (which may be, e.g., a geographic data field) of the respective first and second profiles, and may qualify also based at least in part on a value of a second data field of the respective first and second profiles. The second user may send a confirmation accepting the estimated mileage as actual mileage.

In another aspect of the invention, mileage is tracked by entering first trip data (e.g., as stated above) into a mobile communication device; entering additional trip data (e.g., similar to the trip data as stated above) into the mobile communication device corresponding to additional trips of the first user during corresponding additional time periods; sending the first trip data and the additional trip data to a server over a communications network (optionally after confirming the trip data is accurate, by, e.g., tapping the device); and receiving data from the server over the communications network representing mileage data for the first time period and for the additional time periods. The trip data may be entered into the mobile communication device by tapping the device to confirm the starting and ending odometer readings and/or category and/or start and stop locations for the trip. The starting and ending odometer readings may be entered via a communications link between an odometer and the mobile communication device, or via a communications link between a GPS-enabled navigation system and the mobile communication device. Mileage data may be requested (and received) from the server for the time periods corresponding to the trips, or for another time period, in which case the data would be estimated. The estimate may be based on simple extrapolation (or other manipulation) of the data provided by the first user, and/or at least in part on aggregate trip data reflecting the first trip data and trip data from a second user and/or other users. The first user may send a confirmation to the server over the communications network to confirm acceptance of the estimated mileage as actual mileage. The mileage data received from the server may be in a format suitable for importation into an electronic tax return or other financial or number crunching software.

In another aspect of the invention, a system for tracking mileage includes a server, and a mobile communication device in data communication with the server. The mobile communication device is programmed to receive first trip data and additional trip data (e.g., similar to the trip data as stated above), send the data to the server over a communications network, and receive data from the server over the communications network representing mileage data for the specified time period (e.g., the first time period and the additional time periods). The mobile communication device may also be programmed to export the mileage data in a format suitable for importation into an electronic tax return. The mobile communication device may also be programmed to receive the odometer readings and category of the first trip by at least one tapping action, and/or (at least for the odometer readings) via a communications link between an odometer and the mobile communication device, or a communications link between a GPS-enabled navigation system and the mobile communication device. The mobile communication device may be further programmed to receive the category data and/or start and stop locations by receiving confirmation(s) in response to a prompt or prompts by the mobile communication device, and to calculate trip mileage based on the start and stop locations. The mobile communication device may be further programmed to request estimated mileage data from the server over the communications network, and to receive the estimated mileage data from the server after the request, the estimated mileage data representing estimated mileage for a time period other than the time periods for which the first user provided data (e.g., other than the first time period and the additional time periods), and the estimated mileage being based at least in part on aggregate trip data reflecting the first trip data and trip data from a second user and/or other users. The mobile communication device may be further programmed to receive a confirmation that the estimated mileage received from the server is accepted as actual mileage, and to send a confirmation to the server over the communications network confirming acceptance of the estimated mileage as the actual mileage.

BRIEF DESCRIPTION OF THE DRAWINGS

The foregoing and other aspects of embodiments are described in further detail with reference to the accompanying drawings, wherein.

DETAILED DESCRIPTION OF ILLUSTRATED EMBODIMENTS

Figure 1:
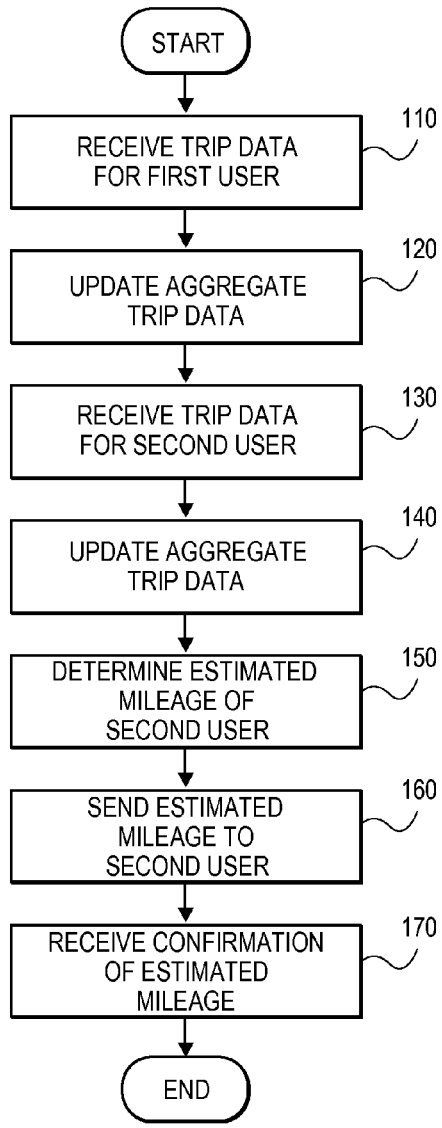
FIG. 1 is a flow diagram of a method of tracking mileage according to one embodiment of the present invention.

For a better understanding of the invention, some terminology involved will be briefly discussed. For convenience, "trip data" as used herein refers to data corresponding to a specific trip or trips, and "mileage data" refers to data corresponding to all "trip data" of a user being considered for a specified time period. "Aggregate data" refers to data reflecting trip data provided by multiple users, regardless of where or how the aggregate data is stored, and when or how the aggregate data is created. For example, aggregate data may be updated only when a user requests an estimate, or it can be updated in real time for each new trip data received. We use the term "aggregate data set" to refer to a specific set of aggregate data defined by values of a set of one or more discrete variables $v(1), v(2), \ldots v(n)$. Once a data set is defined (e.g., by choosing n specific variables), then the number of subsets of the data set is $a*b* \ldots *n$ where a is the number of valid values of $v(1)$, b is the number of valid values of $v(2), \ldots$ and n is the number of valid values of $v(n)$. Once subsets are defined, then clustering algorithms may be used for further accuracy. Clustering is basically the assignment of objects into subsets (i.e., clusters) so objects in the same cluster are similar based on one or more characteristics. Clustering is a well-known technique for statistical data analysis, and thus will be described only briefly herein.

A mileage tracking system of the invention tracks trip data for a user over time, based on trip data provided by the user. The trip data is typically provided/submitted by mobile communication devices transmitting the data to a system server, in response to commands entered into the mobile communication devices (e.g., manually, by tap-and-confirm, via GPS-enabled link, link to an odometer, and/or link to an address book of a vehicle navigation system). The user is provided with results of the tracking (mileage data) for a specified time period (e.g., a tax year), based on the user's trip data. This can be immediately in response to the user's submission of trip data, in response to a specific request from the user, or in response to another trigger or event such as a specific date (e.g., end of a tax year) or specific quantity of trip data having been provided by the user.

When the results of the tracking are going to be sent to the user, if the user's trip data is insufficient because, for example, the user requires trip data for an entire tax year but has provided trip data for a time period or periods less than the entire tax year, then the missing data may be estimated (for purposes of this invention "estimated" may refer to estimating for past time periods and/or predicting for future time periods). This may occur by extrapolating (or otherwise mathematically manipulating) the user's trip data to fill in the gaps for the missing data. In some circumstances, for example if the user's trip data is so insufficient that a reasonable estimate is not feasible using only the user's trip data, data from other users is aggregated and used to estimate the missing data, and for even more accuracy clustering algorithms may be used. A server receives trip data from multiple users (e.g., subscribers) over time, and aggregates the data for use in such situations.

Turning now to FIG. 1, a flow diagram is shown of a method of tracking mileage according to one embodiment of the invention. This embodiment will typically be from the perspective of a computer server, and so the description that follows will refer to the steps as being performed by a computer server. Each step will first be briefly described. Then, after a similar brief description of the method shown by the flow diagram in FIG. 2, the steps of the methods shown in both FIG. 1 and FIG. 2 will be described in more detail.

The method of FIG. 1 starts at Step 110, in which the server receives first trip data corresponding to a first trip of a first user during a first time period. The first trip data is typically received from a mobile communication device (such as a PDA, mobile phone, cell phone, or smart phone), or from a vehicle navigation system. However, the first trip data may be received from any source, and in any manner, including from a desktop PC, laptop, modem, or other data link, and by email, text, or other proprietary data transfer protocol. The first trip data includes: 1) starting and ending odometer readings (which may be the same) corresponding to the start and end of the first trip respectively; 2) starting and ending dates (which may be the same) corresponding to the start and end of the first trip respectively; and 3) a category associated with the first trip. Typical category choices will be selected from a group including IRS-recognized categories for deductible costs of operating a vehicle (which in 2009 were business, charitable, and medical or moving purposes), as well as personal/non-deductible.

After receiving the first trip data, the server updates aggregate trip data in a database at Step 120. The update is based at least in part on at least a portion of the first trip data and on a first profile associated with the first user. As for the profile, for example, the first trip data may be qualified to be aggregated into a particular aggregate data set based at least in part on a value of a first data field/variable in the profile, such as a "Residence" data field, identifying the first user as living in Southern California. In that case, aggregate data for an aggregate data set such as "Southern California Residents" would be updated to reflect the newly received first trip data from the first user.

An aggregate data set may be defined by any number of variables, such as one variable (e.g., geographic location of residence, geographic location of business, user's age, user's profession, user's company, user's corporate title, size of user's company, market share of user's company), or two, three, four, five, six, seven, eight, nine, ten, or more variables. The first trip data may be qualified to be aggregated into such an aggregate data set based at least in part on a value of a second data field in the profile, such as a "Company" data field, identifying the first user as working for Company X. In that case, aggregate data for an aggregate data set such as "Southern California Residents working for Company X" would be updated to reflect the newly received first trip data from the first user.

If a user's profile data qualifies the user as a member of multiple aggregate data sets, then those multiple aggregate data sets may be updated for each new trip data received from the user. For example, a user's profile data may qualify the user as a member of three separate aggregate data sets corresponding to "Southern California Residents," "Profession=Insurance Sales," and "Company=INTUIT" respectively. The aggregate trip data is used for later estimating odometer readings and/or mileage for users who need gaps filled in for such missing data.

Over time, the server receives trip data from multiple users, such as subscribers to a proprietary system for tracking mileage. Typically, all of the trip data received is used to update not only the trip data for the individual user who sent it in, but also to update one or more aggregate data sets to which the individual user belongs based on rules defined to classify users according to user profiles. So in the simplest example, as shown at Step 130, the server receives second trip data corresponding to a second trip of a second user during a second time period. The second trip data, like the first, includes starting and ending odometer readings corresponding to the start and end of the second trip respectively, starting and ending dates corresponding to the start and end of the second trip respectively, and a category associated with the second trip, and typically would also be received from a mobile communication device.

At Step 140, the server updates the aggregate trip data based at least in part on at least a portion of the second trip data and on a second profile associated with the second user, similar to as described above with respect to the first user. For example, the second trip data may also qualify to be aggregated into the "Southern California Residents" aggregate data set based at least in part on a value of the same "Residence" data field of the second profile identifying the second user as also living in Southern California. Likewise, the second trip data may be qualified to be aggregated into a multi-variable aggregate data set based at least in part on a value of a second data field in the profile, such as a "Company" data field, identifying the first user as working for Company X. In that case, aggregate data for an aggregate data set such as "Southern California Residents working for Company X" would be updated to reflect the newly received second trip data from the second user.

In this simple example, the only data received by the server thus far will have been the first trip data and the second trip data, so any aggregate data sets would have at most data from only those two users—and data from only one trip from each user. But over time, as these users and other users send their trip data to the server, the volume of trip data would increase to allow the various aggregate data sets to be populated with more and more data, making them thus more and more reliable for use in estimating mileage for individual users.

At Step 150, the server determines an estimated mileage for a user (in this example, the second user) for a period of time other than the second time period, based at least in part on the aggregate trip data. This may be done immediately in response to the second user's submission of trip data, or in response to a specific request from the second user, or in response to another trigger or event such as a specific date (e.g., end of a tax year) or specific quantity of trip data having been provided by the user. The process of determining the estimated mileage is the subject of a much more detailed explanation herein. At Step 160, the server then sends data (representing the estimated mileage) to the second user over a communications network (typically the Internet), and the data may be displayed on the second user's mobile communication device, PC, or other display screen, and/or may be in a format suitable for importation into an electronic tax return or other software application for printing or other manipulation. In some instances, the server can also receive a confirmation from the second user that the second user accepts the estimated mileage as actual mileage (see Step 170), and may store or use this information for later reporting, statistical, or other purposes.

Figure 2:
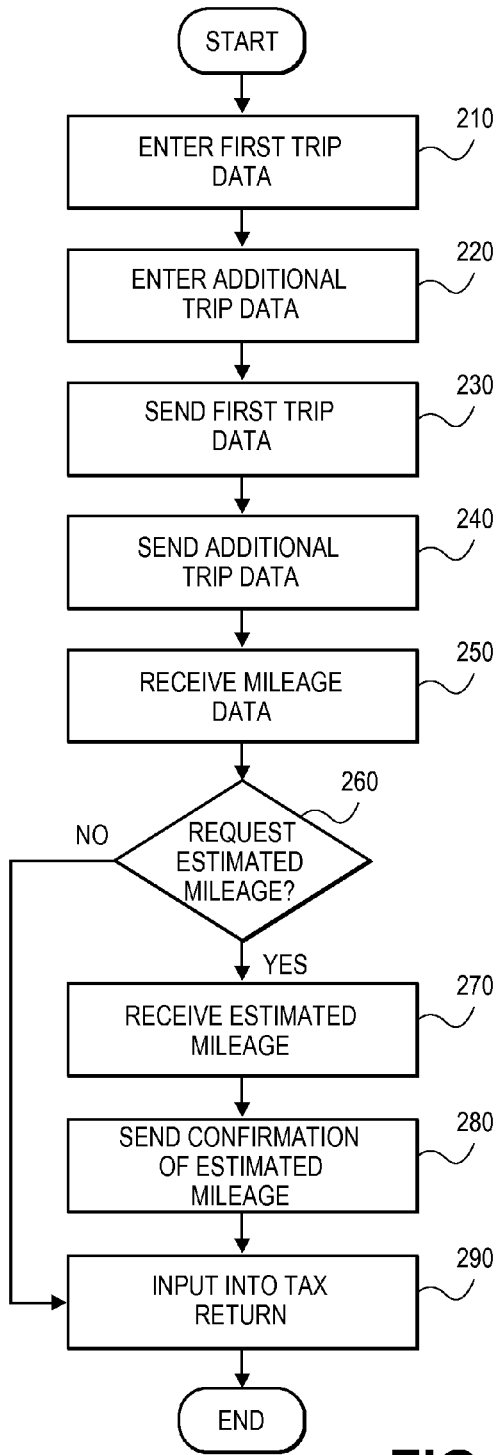
FIG. 2 is a flow diagram of a method of tracking mileage according to one embodiment of the present invention.

Turning now to FIG. 2, a flow diagram is shown of a method of tracking mileage according to one embodiment of the invention. This embodiment will typically be from the perspective of a user or subscriber to a mileage tracking service, and so the description that follows will refer to the steps as being performed by a user. As with FIG. 1, each step will first be briefly described, and then more fully described subsequently.

The method of FIG. 2 starts at Step 210, in which first trip data is entered into a mobile communication device. The first trip data corresponds to a first trip of a first user during a first time period. The first trip data includes starting and ending odometer readings corresponding to the start and end of the first trip respectively, starting and ending dates corresponding to the start and end of the first trip respectively, and a category associated with the first trip, similar to as described with respect to FIG. 1. The data may be entered in a variety of ways, including: direct manual data entry via a hardware and/or software interface to the mobile communication device (including, for example, tapping a screen of the mobile communication device to enter and/or confirm data, character input, voice input, etc.), or downloading the data from a source having access to reasonably accurate determination of the data (e.g., the starting and ending odometer readings and/or the start and end dates) via a communications link between an odometer and the mobile communication device, or between a GPS-enabled navigation system and the mobile communication device; or a combination of multiple ways. Some or all of the data entry (e.g., category, start and stop locations, etc.) may occur by the user confirming prompts on a display of the mobile communication device and/or navigation system, to minimize the actual data entry required by the user. The user may be prompted to confirm any or all of the data (e.g., by tapping a display screen of the mobile communication device and/or a navigation system), and may be provided manual override options for modifying the data at any time. Quick-adjust options may also be used, for example to allow a user to round up or down, or make other quick adjustments.

Additional trip data is entered into the mobile communication device over time for additional trips, as shown at Step 220. The additional trip data corresponds to additional trips of the first user during corresponding additional time periods. The additional trip data, like the first trip data, includes for each additional trip, starting and ending odometer readings corresponding to the start and end of the trip respectively, starting and ending dates corresponding to the start and the end of the trip respectively, and a category associated with the trip. Both the first trip data and the additional trip data may be entered during the corresponding trips, but the data may be entered any time, including before the trip (e.g., when the user knows of a planned trip) or after the trip (e.g., when the user did not have access to the mobile device or forgot to enter the trip data originally).

At step 230, the first trip data is sent to a server over a communications network. This may be performed using any data transfer protocol, and typically this will be performed using a wireless data link from the mobile communication device to the server (but may also be done using a PC, for example). The data may be in any format, including standard formats such as CSV, or proprietary formats. At Step 240, the additional trip data is likewise sent to the server over the communications network. The first trip data and/or the additional data may be sent in real time, i.e., as each trip is completed, or in intervals as directed by the user, e.g., by activating a SEND command to send all accumulated trip data not yet sent. In this sense, all of the trip data (the first trip data and the additional trip data) may be sent at substantially the same time, by activation of a single SEND command.

Ultimately, at Step 250, the user receives data from the server over the communications network, representing mileage data for the first time period and for the additional time periods. In its simplest form, the mileage data is merely an accumulation of the trip data previously sent to the server in Steps 230 and 240 (although perhaps reformatted), but the mileage data may also be extrapolated to cover an expanded time period (such as an entire tax year) even though the trip data submitted by the user does not cover one or more time periods during the tax year. Typically the mileage data received will be reformatted into a proprietary format for use in a proprietary software such as, e.g., TURBOTAX tax preparation software, or a mileage tracking software.

In some instances, the user may require trip data for time periods other than the first time period and the additional time periods. For example, if the user submitted trip data for time periods covering only June 1st to December 31st of a particular tax year, the user may need estimated trip data for the time period of January 1st through May 31st of the same tax year, in order to prepare a tax return. Likewise, if the user submitted trip data for time periods covering only January 1st to May 31st of a particular tax year, the user may need estimated trip data for the time period of June 1st through December 31st of the same tax year. Thus, the user may request estimated mileage as shown at Step 260. This may be done by an express request such as a RECEIVE or "SmartCalc" command via the mobile communication device, or via a PC for example, or through use of a subscription or periodic update option selected by the user. If the request is made (or even if not), the user may receive the estimated mileage data from the server over the communications network, representing estimated mileage for a time period other than the first time period and the additional time periods (e.g., January 1st through May 31st, or June 1st through December 31st, in the above examples). This is shown at Step 270. The estimated mileage may be based on a simple mathematical algorithm such as extrapolation of the data submitted by the user. But the estimated mileage may also be based at least in part on aggregate trip data reflecting not only the first trip data and additional trip data from the user, but also trip data from a second user, and in many instances trip data from many other users as well. In this manner, the estimated mileage data for the user is likely to be more accurate. The use of aggregate trip data for this purpose is explained more fully herein.

As shown at Step 280, after receiving estimated mileage data from the server, the user may also send a confirmation to the server over the communications network, confirming acceptance of the estimated mileage as actual mileage. This information (acceptance of the estimated mileage as actual mileage) may be used by the server for later data analysis and reporting, or other purposes. At some point after receiving the mileage data (either as shown at Step 250, or as shown at Step 270), the user may choose to import the mileage data into a proprietary software application, such as software application used to prepare electronic tax returns. This is shown at Step 290.

Certain aspects of the invention will now be described in more detail, including the process of aggregating data and using the aggregate data for later estimates of mileage data. For simplicity, specific examples will be used, and the examples will be based primarily on obtaining mileage estimates for a calendar tax year, although the invention may be used for other purposes as well, such as mileage reimbursement. The tax year example is chosen because a contemplated use of the invention is to provide mileage data to a user so the user may reasonably estimate tax-year mileage for purposes of tax reporting. The IRS typically requires odometer readings for January 1st and December 31st, total miles for the year, and for each trip the date, purpose (i.e., category), and start/stop odometer readings. So the invention may help to defend an IRS audit.

Figure 4:
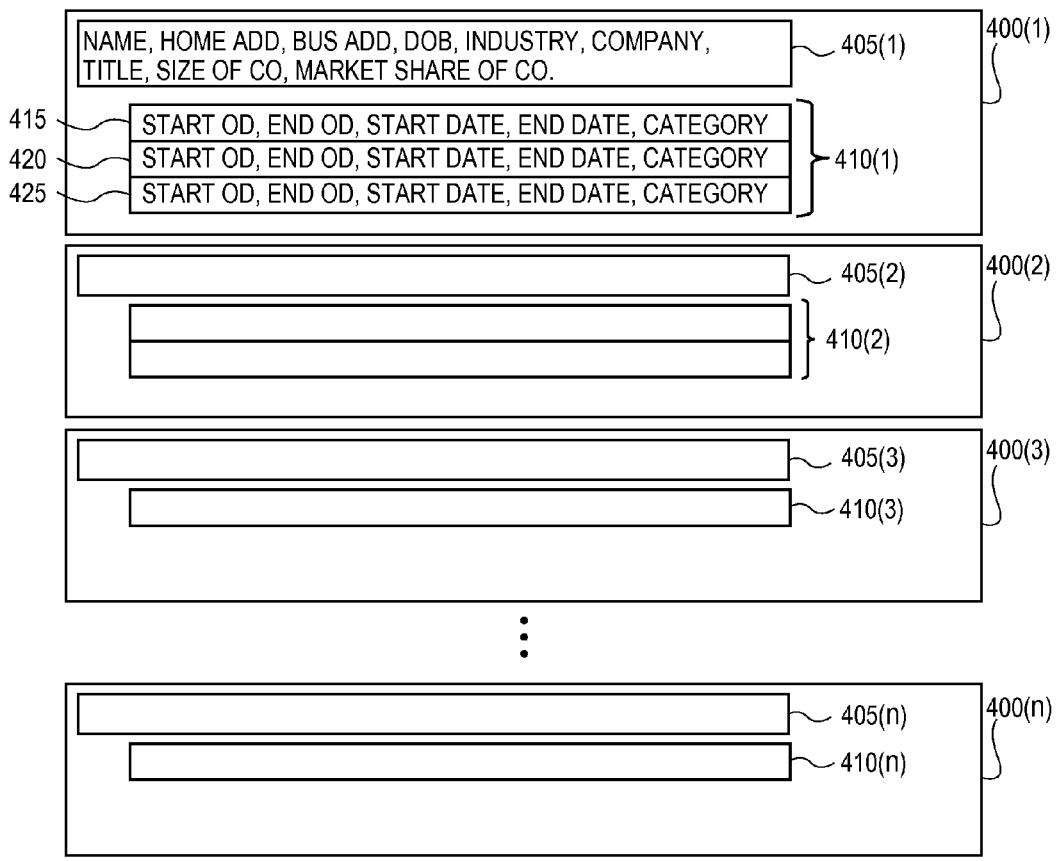
FIG. 4 shows an exemplary record layout of database records used in one embodiment of the present invention.

A sample database record layout that may be used in accordance with the present invention is shown in FIG. 4. Reference numbers are shown with subscripts (1)-(n) to correspond to multiple analogous data records in the database, for users (1)-(n). However, for simplicity, when a database component is referred to herein in general, the reference number will be used without a subscript. For example, each user has his or her own record, shown in FIG. 4 as 400(1), 400(2), 400(3), and 400(n), corresponding to a first user, a second user, a third user, and an nth user respectively. Thus, reference numeral "400" with no subscript is used herein to refer to any database record, or the database record for the particular user then being discussed.

Each record has a profile portion 405 with fields for basic data such as name, home address, business name and address, date of birth, job title, job description, job industry, etc.). Valid data for most fields of the profile 405 should be limited to a discrete number of possible values, even though one of the values may be "miscellaneous" or "other" for example.

Each profile 405 may also have a unique identifier. Certain profile fields are populated by user input (e.g., using a "Setup" button as described with respect to FIG. 5), but other profile fields may be derived. For example, a profile field for "West Coast" may be derived from internal mapping algorithms assigning specific states or zip codes to the "West Coast." Similarly, the profile data may include identification of which aggregate data sets the user belongs to, which is determined by the server based on customized and/or preset qualification rules. Each record 400 also includes one or more entries of trip data 410, as described herein. A user's trip data entries 410 are populated as the user send in the trip data to the server as described herein. For example, FIG. 4 shows the first user (1) has trip data 410(1) for three separate trips, 415, 420, and 425. Of course over time, users will likely have much more trip data.

Figure 5:
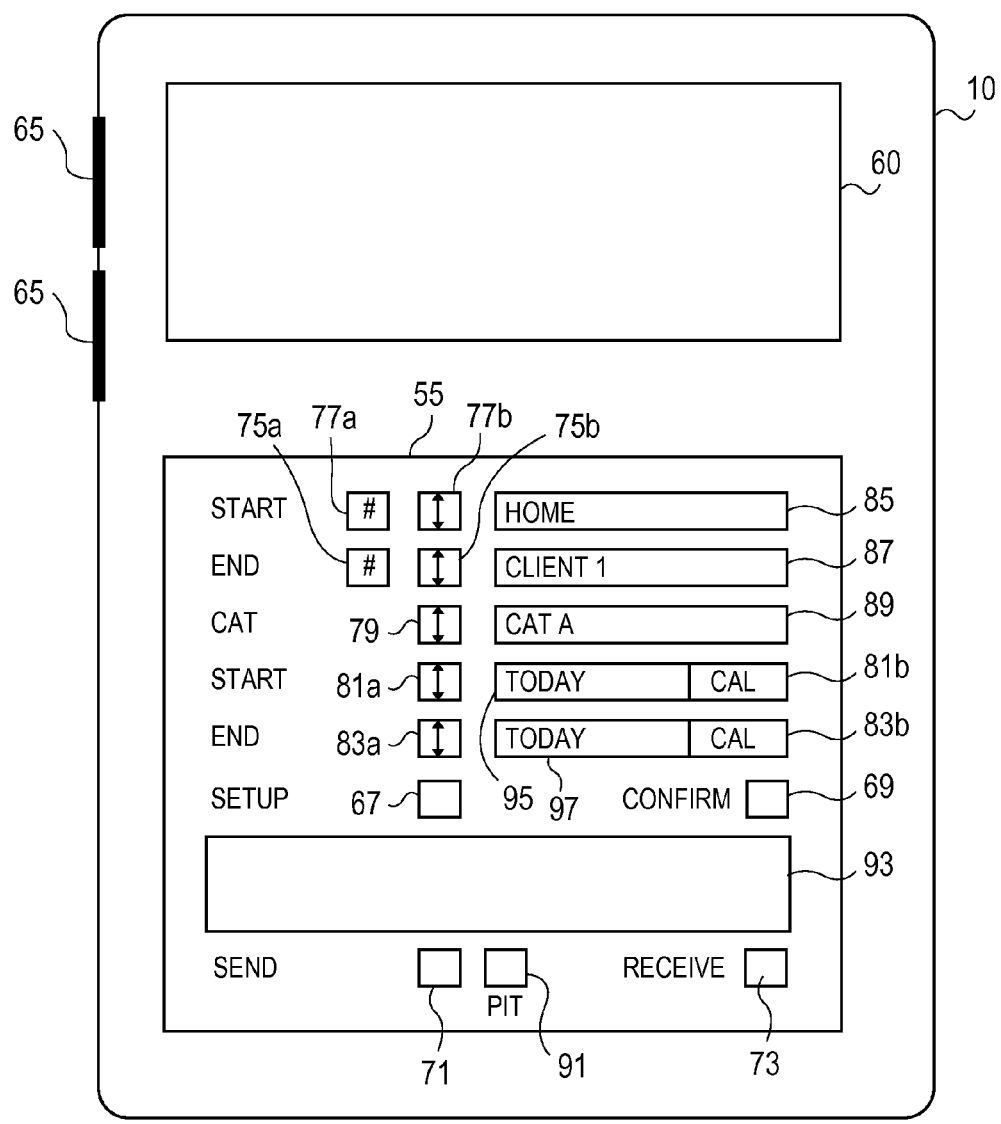
FIG. 5 shows an exemplary screen layout for entering trip data and other data into a mobile communication device, that may be used in one embodiment of the present invention.

Turning now to FIG. 5, a sample screen layout is shown on a screen 55 of a mobile communication device 10. The device 10 is configured to accept data input by tapping or otherwise touching of the screen 55, conventional manual data entry via input device 60 such as a keyboard, keypad, and/or trackball, or via other data ports 65 such as USB or wireless ports. The following examples will be described using input to screen 55, but the input may be via a PC interface or other input device, and then loaded into the mobile communication device 10.

In an exemplary embodiment, there is a Setup button 67 (more accurately this is described as a Setup "area," but "button" is used for convenience) that can be tapped to activate a setup procedure. This triggers a series of options for the user to enter various data, such as profile data, security information, instructions to assign categories to predefined common trips, instructions to assign specific labels (e.g., HOME) to specific locations, special requests such as to review and/or revise past trip data submitted, to initiate or maintain a subscription to the tracking service, to enter initial odometer reading if needed (e.g., if the first trip is defined by start and stop locations as opposed to a starting odometer reading), etc. Setup may also be used to configure various screen display options (e.g., layout), programming options (e.g., whether the user would like to bypass the "Confirm" step before sending trip data, whether the user would like to assign a single tap or double tap to represent specified actions), to define other devices in the communications network (e.g., navigation system 20, other mobile communication devices 10 of the user), specify data formats (e.g., CSV, proprietary) and/or quantity (e.g., summary, detail) of the mileage data to be received, and to perform other administrative functions.

Confirm button 69 issued to confirm prompts from the mobile communication device 10, or to confirm specified actions such as sending trip data to the server 5. SEND button 71 and RECEIVE button 73 are used to send data to and receive data from the server respectively, as described herein. For example, SEND button 71 may be used to send trip data, and RECEIVE button 73 may be used to request mileage data (e.g., Step 250 or Step 270 in FIG. 2), or even historical trip data for a single trip to confirm and/or update. Other buttons are used to enter the trip data. For example: START buttons 77a and/or 77b and END buttons 75a and/or 75b are used to enter in the start and end odometer readings respectively for a trip; CAT button 79 is used to enter the category of the trip; START button 81a and/or CAL button 81b, and END button 83a and/or CAL button 83b, are used to enter in the start and end dates respectively for a trip.

Other areas of the screen 55 are used for data display corresponding to the trip data. These areas (85, 87, 89, 93, 95, 97) will be referred to as "windows" for convenience because they are shown in the format of a window. Window 85 displays the start odometer reading for a trip. This field may be populated by direct data entry, e.g., using button 77a to activate number entry mode (likewise for button 75 a and the ending odometer reading). This field may also be populated by download from a communications link between the mobile communication device 10 and the odometer, or between the mobile communications device 10 and a navigation system 20. Or button 77b may be used to activate and use a scroll feature to allow the user to scroll various previously entered start locations through the window 85 to select from. Button 75b is used for a similar purpose with respect to the ending location. The previously entered start and/or end locations may be entered or loaded into tables as part of a setup procedure, and/or each time a trip is entered the system may prompt the user for an option to add the then-current location to the START and/or END location tables for later use in the scroll-down selection feature. Using the locations entered in the start and end location tables, the system may also prompt a user after a certain trip to confirm, e.g., that the trip was from HOME to OFFICE. This may be based on the determination that the start was relatively close to HOME and the end was relatively close to OFFICE. Likewise, certain trips (such as HOME to CLIENT 1) may have a category such as BUSINESS pre-assigned (preferably subject to confirmation). The system can use many programming algorithms to try and pre-fill data to minimize data entry for the user.

FIG. 5 shows window 85 with a value of "HOME" representing that the start location is the user's home, for which the system typically will have the necessary GPS coordinates logged so as to be able to calculate mileage from HOME to another location. Likewise, FIG. 5 shows window 87 with a value of "CLIENT 1" representing the destination is CLIENT 1, for which the system typically will have the necessary GPS coordinates logged so as to be able to calculate mileage. In the case where a user selects start and/or stop locations (such as HOME and/or OFFICE) as opposed to entering in specific start and/or stop odometer readings, the system would be able to determine only a distance traveled, but would be able to use this information to later determine or estimate the actual odometer readings for the trip based on other odometer readings entered as part of the user's cumulative trip data. For example, if the last odometer reading was 1,000 miles, then this trip from HOME to OFFICE would have a start odometer reading of 1,000, and if the distance traveled was 100 miles, then the ending odometer reading for the trip would be determined to be 1,100 miles.

Window 89 is used to display the category for the trip. This may be selected using button 79 to activate the scroll feature for window 89. FIG. 5 shows the value as CAT A, but typically the category will be either business, personal, medical/moving, or charity. Of course there can always be an "other" or "unknown" option for this field, as with most other fields, and such value can be updated at a later time, or just left as is and accounted for (perhaps by exclusion) accordingly. A pre-filling option regarding categories may be for the system to prompt the user to confirm the category for the then-present trip is still the same as for the previous trip, e.g., PERSONAL, and/or to switch a default category if a certain category has been used for a long period of time. The system may use other criteria to select probable values for the current trip, such as the short distances traveled, the time of year or time of week (e.g., weekend may be more likely to be PERSONAL), etc.

Additional categories may be ON VACATION or REPAIR, in which case the system will be able to determine that zero miles are traveled for the days during which the category is set as such, resulting in calculations adjusted accordingly. For example, if a user has provided trip data for 30 days, then the simplest estimate for daily travel within each category would be to divide the total miles for that category by 30. But if the system accounted for 10 of those days in which there was no travel (i.e., the category was REPAIR), then the same simple estimate would be to divide by only 20, since the data represents actual travel for only 20 days.

Windows 95 and 97 are used to display the start and end dates respectively of the trip. These fields are shown as TODAY in FIG. 5, which may be the default preloaded date used by the system. However, these dates may be increased or decreased using scroll buttons 81a and 83a, or entered directly into window 95 or 97 (e.g., by tapping to select the windows), or by activating a calendar program using CAL buttons 81b or 83b respectively.

There may also be a "pit stop" button 91 that the user could use as a quick on/off toggle to switch categories in the middle of a trip. For example, if on a business trip, the user decides to go visit a friend, the pit stop button 91 could be selected (and the system would then prompt for which category to switch to), and then when the user was done with the pit stop visit to a friend, the user could select the pit stop button again, and the system would then reset (with or without prompt) to the category in use just before the pit stop. Area 93 may be used for messages and other data display, to allow for a more robust interface with a server, PC, navigation system, and even for data entry into the mobile communication device itself.

As previously discussed, one aspect of the invention is to use aggregate data to provide estimates to the user to fill in the gaps for missing data. In essence, math algorithms are used so that given only a small amount of seed data, other data may be estimated/predicted. Specifically, aggregate data (which includes data from other users) may be cross referenced for additional accuracy, and in turn estimated values for odometer readings may be suggested to the user. The "SmartCalc" command, e.g., would trigger a calculation to estimate all required odometer readings based on only a few "seed" readings supplied by the user. This allows the user to enter a few pieces of data, yet receive detailed estimates at tax time.

To create the aggregate data, the server collects profile data and trip data from multiple users, such as subscribers to the mileage tracking system. Each time a user submits trip data, the server may update aggregate data (see Step 140 in FIG. 1). The determination of which aggregate data sets to update is based at least in part on at least a portion of the trip data received, and on profile data associated with the user who submitted the trip data being reviewed. Aggregate data sets are defined by values of a set of one or more discrete variables $v(1), v(2), \ldots v(n)$ as previously described. Any combination of variables may be used to define an aggregate data set.

For example, one aggregate data set may be defined by a value of a single data field/variable called "zip code" within the profile data being within a set of zip codes known to be the zip codes for Southern California. For convenience, this aggregate data set will be referred to as the "SoCal" data set. Whenever the server receives trip data from a user whose profile data contains a zip code qualifying the user as a member of the SoCal data set, the trip data thus qualifies to be aggregated into the SoCal data set. The format may be the same or similar to the data stored for individual users, but in effect the "user" is an aggregate of all users who qualify as members of the data set. So if 100 different users have zip codes in SoCal, and each submits 30 trip data entries over a specified period, the SoCal aggregate data set would have 3,000 trip data entries (analogous to 415, 420, 425 in FIG. 4). As previously stated, this data may be aggregated and stored as an actual separate "user," or the data may be derived or dynamically determined at any time using then-available individual trip data. So in this example, to determine estimated mileage data for a user (e.g., Step 150 of FIG. 1), if the user qualifies for the SoCal data set, then even though the user submitted only 30 trip data entries, any missing gaps can be estimated using the other 2700 trip data entries from users qualifying for the same SoCal data set. The specific algorithm may be simple averaging, or more complicated algorithms, and may include clustering. The clustering algorithm may be based on a single variable, or on multiple variables. Further, if the user qualifies for multiple aggregate data sets, then the estimates (including clustering algorithms) may take into account the multiple aggregate data sets.

Another example for one aggregate data set may be defined by values of two data fields/variables. For simplicity, we will use the "zip code" data field again, but this time combine it with the "profession" variable, to define an aggregate data set called "SoCal insurance salespeople." This data set would include trip data for users who had zip codes in their respective profiles within the SoCal area, as well as having a profession in their respective profiles identified as insurance sales. Whenever the server receives trip data from a user whose profile data contains a zip code AND a profession code qualifying the user as a member of the SoCal salespeople data set, the trip data thus qualifies to be aggregated into the SoCal salespeople data set. For this example, trip data qualifies to be aggregated into the aggregate data set based at least in part on a value of a first data field (zip code) and on a value of a second data field (profession) of the user's profile.

Figure 3:
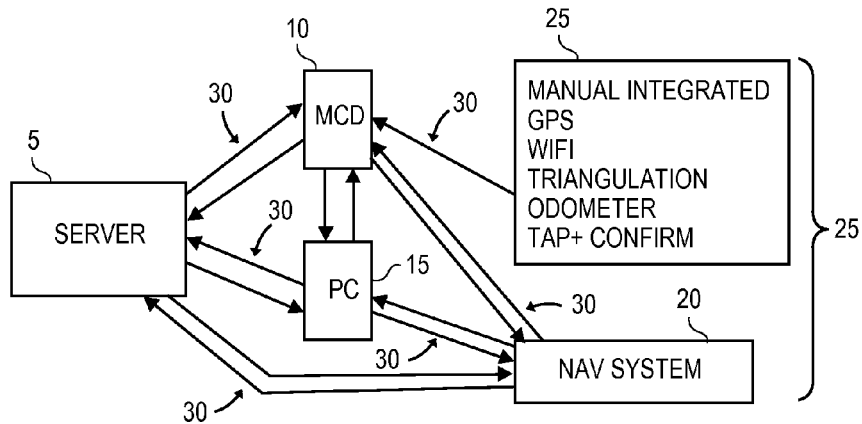
FIG. 3 is a system diagram showing the communication links used in one embodiment of the present invention.

Turning now to FIG. 3, a system diagram is shown illustrating a communications network used in one embodiment of the present invention, with various communications links 30. The computer server 5 is in data communication with a mobile communication device 10, a desktop/laptop computer (PC) 15, and/or a vehicle navigation system 20, of a first user, so data may be exchanged between the server and those devices. Likewise, the devices are in data communication with each other for data exchange, synchronization. There are typically multiple mobile communication devices 10, PCs 15, and vehicle navigation systems 20, associated with multiple corresponding users, and there may also be multiple servers 20. For simplicity, only a single one of each of these is shown and described in accordance with FIG. 3.

The mobile communication device 10 may an IPHONE having an application embodying one or more aspects of the invention, such that the application could run in the background while the user listens to music, plays games, or activates other applications. The mobile communication device 10 is also in data communication with PC 15, and navigation system 20, so data may be transferred between them. The connection to PC 15 provides the user with the ability to use a larger display for more complex application interfaces to interact with the server, and also to transfer trip data and/or mileage data from the mobile communication device 10 to a software application such as one for preparing electronic tax returns. In this regard, a software application is installed on the mobile communication device 10 that is compatible with a software application on the PC 15, to allow such data transfer. The mobile communication device 10 is also in data communication with navigation system 20, so data such as contact data and location data may be transferred and/or synched between them. Likewise, PC 15 (in practice, most likely a laptop) is in data communication with navigation system 20.

Various interfaces 25 may exist to allow data input into the mobile communication device 10. These include integrated input interfaces (e.g., keyboard, keypad, voice recognition unit, touch screen, mouse or roller ball, stylus, etc.), wireless links and wired links such as a USB or other connection directly to a PC 15 or vehicle odometer. Data may be input into the mobile communication device 10 from the PC 15, for example, during a review and edit process using software on the PC 15, to update data (trip data and/or general profile data) for transfer to the mobile communication device 10, or in a situation wherein the server 5 is adapted to receive data from the mobile communication device 10 but not from PC 15, and the user nonetheless opts to update data via the PC interface. The communication links 30 described herein may be established using state of the art technology (e.g., GPS-enabled communications, BLUETOOTH, USB), or in any manner suitable to allow the required data transfer as described herein. Typically the server is connected to the other components of the communications network through the Internet, but LANs, WANs, or other network connections are also envisioned.

Typical application software (and/or firmware, hardware) on the mobile communication device 10 will be programmed and adapted to allow performance of the methods described herein. For example, the mobile communication device 10 may be programmed to receive the first trip data and the additional trip data as described herein, to send the first trip data and the additional trip data to the server as described herein, and to receive the mileage data (representing mileage for the first time period and for the additional time periods, and/or for other time periods) from the server as described herein.

The device 10 may also be programmed to: export the mileage data in a format suitable for importation into an electronic tax return; receive the starting and ending odometer readings of the first trip, and the category of the first trip, by at least one tapping action (such as tap to confirm the data presented on a display of the mobile communication device 10); receive the starting and ending odometer readings of the first trip via a communications link between an odometer and the mobile communication device 10; receive the starting and ending odometer readings of the first trip (and/or start and end dates of the first trip) via a communications link between a GPS-enabled navigation system and the mobile communication device 10; receive the category of the first trip by receiving a confirmation in response to a prompt by the mobile communication device 10; receive start and stop locations for the first trip in response to a prompt by the mobile communication device 10, and to calculate mileage for the first trip based on the start and stop locations; to receive data from the server representing estimated mileage for a time period other than the first time period and the additional time periods, wherein the estimated mileage is based at least in part on aggregate trip data reflecting the first trip data and trip data from a second user and/or other users; receive a confirmation confirming the estimated mileage is accepted as actual mileage, and to send a confirmation to the server confirming acceptance of the estimated mileage as the actual mileage; request estimated mileage data from the server; and/or receive estimated mileage data from the server (after the request, or even in the absence of a request).

Systems and methods have thus been described for tracking and estimating mileage. Accordingly, embodiments are intended to exemplify alternatives, modifications, and equivalents that may fall within the scope of the following claims.

What is claimed is:

1. A method of tracking mileage using a computer comprising:
   the computer receiving first trip data corresponding to a first trip of a first user during a first time period, the first trip data comprising a starting odometer reading and an ending odometer reading corresponding to a start and an end of the first trip respectively, a starting date and an ending date corresponding to the start and the end of the first trip respectively, and a category associated with the first trip;
   the computer collecting a first profile associated with the first user, the first profile containing at least a first data field corresponding to a characteristic of the first user;
   the computer updating aggregate trip data in a database based at least in part on at least a portion of the first trip data and on the first profile associated with the first user;
   the computer receiving second trip data corresponding to a second trip of a second user during a second time period, the second trip data comprising a starting odometer reading and an ending odometer reading corresponding to a start and an end of the second trip respectively, a starting date and an ending date corresponding to the start and the end of the second trip respectively, and a category associated with the second trip;
   the computer collecting a second profile associated with the second user, the second profile containing at least a first data field corresponding to a characteristic of the second user;
   the computer updating the aggregate trip data with at least a portion of the second trip data based on a matching of the first data field for the first user and the first data field for the second user match;
   the computer determining an estimated mileage for the second user for a period of time other than the second time period, based at least in part on the aggregate trip data; and
   the computer sending data representing the estimated mileage to the second user over a communications network.

2. The method of claim 1, wherein receiving the first trip data comprises receiving the first trip data from a first mobile communication device, and receiving the second trip data comprises receiving the second trip data from a second mobile communication device.

3. The method of claim 1, wherein receiving the first trip data comprises receiving the first trip data from a vehicle navigation system.

4. The method of claim 1, further comprising receiving a confirmation from the second user that the second user accepts the estimated mileage as actual mileage.

5. The method of claim 1, wherein the first trip data qualifies to be aggregated into the aggregate trip data based at least in part on a value of a second data field of the first profile, and the second trip data qualifies to be aggregated into the aggregate trip data based at least in part on a value of a second data field of the second profile.

6. The method of claim 1, wherein the category associated with the second trip is selected from the group consisting of: business purpose; personal purpose; medical or moving purpose; and service to a charitable organization.

7. The method of claim 1, wherein the sending of data representing the estimated mileage data comprises sending the estimated mileage data in a format suitable for importation into an electronic tax return.

8. The method of claim 1, wherein the first data field is a geographic data field.

9. The method of claim 1, wherein the estimated mileage is determined by at least one of averaging or clustering.

10. A method of tracking mileage comprising:
    entering first trip data into a mobile communication device, the first trip data corresponding to a first trip of a first user during a first time period, the first trip data comprising a starting odometer reading and an ending odometer reading corresponding to a start and an end of the first trip respectively, a starting date and an ending date corresponding to the start and the end of the first trip respectively, and a category associated with the first trip;
    entering additional trip data into the mobile communication device, the additional trip data corresponding to additional trips of the first user during corresponding additional time periods, the additional trip data comprising for each additional trip, a starting odometer reading and an ending odometer reading corresponding to a start and an end of the trip respectively, a starting date and an ending date corresponding to the start and the end of the trip respectively, and a category associated with the trip;
    sending the first trip data to a server over a communications network;
    sending the additional trip data to the server over the communications network;
    collecting at the server a first profile associated with the first user, the first profile containing at least a first data field corresponding to a characteristic of the first user;
    aggregating trip data at the server reflecting the first trip data, the additional trip data, and trip data from a second user having a second profile associated with the second user, the second profile containing at least a first data field corresponding to a characteristic of the second user, wherein the trip data from the second user is aggregated with the first trip data and additional trip data based on a matching of the first data field of the first user and the first data field of the second user; and
    receiving estimated mileage data, from the server over the communications network, representing an estimated mileage for a time period other than the first time period and the additional time periods, the estimated mileage being based at least in part on aggregate trip data reflecting the first trip data, the additional trip data, and trip data from a second user.

11. The method of claim 10, wherein the category associated with the first trip is selected from the group consisting of: business purpose; personal purpose; medical or moving purpose; and service to a charitable organization.

12. The method of claim 10, further comprising importing the estimated mileage data for the first time period and for the additional time periods into an electronic tax return.

13. The method of claim 10, wherein entering the first trip data into the mobile communication device comprises tapping the mobile communication device to confirm the starting odometer reading, the ending odometer reading, and the category.

14. The method of claim 10, wherein entering the first trip data into the mobile communication device comprises downloading the starting odometer reading and the ending odometer reading into the mobile communication device via a communications link between an odometer and the mobile communication device.

15. The method of claim 10, wherein entering the first trip data into the mobile communication device comprises downloading the starting odometer reading and the ending odometer reading into the mobile communication device via a communications link between a GPS-enabled navigation system and the mobile communication device.

16. The method of claim 10, wherein entering the first trip data into the mobile communication device comprises confirming the category for the trip prompted by the mobile communication device.

17. The method of claim 16, wherein entering the first trip data into the mobile communication device comprises confirming a start location and a stop location for the first trip prompted by the mobile communication device.

18. The method of claim 10, further comprising tapping the mobile communication device to confirm the trip data, before sending the trip data to the server.

19. The method of claim 10, further comprising sending a confirmation to the server over the communications network, confirming acceptance of the estimated mileage as actual mileage.

20. The method of claim 19, further comprising requesting the estimated mileage data from the server, and wherein the estimated mileage data is received from the server after the request.

21. The method of claim 10, further comprising importing the estimated mileage data into an electronic tax return.

22. The method of claim 10, wherein the estimated mileage is determined by at least one of averaging or clustering.

23. A system for tracking mileage of multiple users comprising:
   a server programmed to;
      collect a first profile associated with the first user, the first profile containing at least a first data field corresponding to a characteristic of the first user;
      collect a second profile associated with a second user, the second profile containing at least a first data field corresponding to a characteristic of the second user;
      aggregate trip data from the first user and the second user based on a matching of the first data field of the first user and the first data field of the second user; and
   a mobile communication device in data communication with the server, and programmed to:
      receive first trip data, the first trip data corresponding to a first trip of a first user during a first time period, the first trip data comprising a starting odometer reading and an ending odometer reading corresponding to a start and an end of the first trip respectively, a starting date and an ending date corresponding to the start and the end of the first trip respectively, and a category associated with the first trip;
      receive additional trip data, the additional trip data corresponding to additional trips of the first user during corresponding additional time periods, the additional trip data comprising for each additional trip, a starting odometer reading and an ending odometer reading corresponding to a start and an end of the trip respectively, a starting date and an ending date corresponding to the start and the end of the trip respectively, and a category associated with the trip;
      send the first trip data to the server over a communications network;
      send the additional trip data to the server over the communications network; and
      receive estimated mileage data, from the server over the communications network, representing an estimated mileage for a time period other than the first time period and the additional time periods, the estimated mileage being based at least in part on aggregate trip data reflecting the first trip data and trip data from a second user.

24. The system of claim 23, wherein the category associated with the first trip is selected from the group consisting of: business purpose; personal purpose; medical or moving purpose; and service to a charitable organization.

25. The system of claim 23, wherein the mobile communication device is further programmed to export the estimated mileage data in a format suitable for importation into an electronic tax return.

26. The system of claim 23, wherein the mobile communication device is further programmed to receive the starting odometer reading of the first trip, the ending odometer reading of the first trip, and the category of the first trip, by at least one tapping action.

27. The system of claim 23, further comprising a communications link between an odometer and the mobile communication device, and wherein the mobile communication device is further programmed to receive the starting odometer reading of the first trip and the ending odometer reading of the first trip via the communications link between the odometer and the mobile communication device.

28. The system of claim 23, further comprising a communications link between a GPS-enabled navigation system and the mobile communication device, and wherein the mobile communication device is further programmed to receive the starting odometer reading and the ending odometer reading via the communications link between the GPS-enabled navigation system and the mobile communication device.

29. The system of claim 23, wherein the mobile communication device is further programmed to receive the category of the first trip by receiving a confirmation in response to a prompt by the mobile communication device.

30. The system of claim 23, wherein the mobile communication device is further programmed to receive a start location and a stop location for the first trip in response to a prompt by the mobile communication device, and to calculate mileage for the first trip based on the start and stop locations.

31. The system of claim 23, wherein the mobile communication device is further programmed to receive a confirmation confirming the estimated mileage is accepted as actual mileage, and to send a confirmation to the server over the communications network confirming acceptance of the estimated mileage as the actual mileage.

32. The system of claim 31, wherein the mobile communication device is further programmed to request the estimated mileage data from the server, and to receive the estimated mileage data from the server after the request.

33. The system of claim 23, wherein the estimated mileage is determined by at least one of averaging or clustering.

* * * * *